United States Patent [19]

Swett

[11] Patent Number: 4,965,010
[45] Date of Patent: Oct. 23, 1990

[54] PAINT STRIPPING COMPOSITION CONTAINING KETONES, METHANOL, AND AROMATIC HYDROCARBON

[76] Inventor: Ralph R. Swett, 701 Putnam, Wakefield, Mich. 49968

[21] Appl. No.: 263,426

[22] Filed: Oct. 27, 1988

[51] Int. Cl.$^5$ .............................. C09D 9/00; B01F 1/00
[52] U.S. Cl. .................................... 252/170; 252/171; 252/364; 252/90; 134/38
[58] Field of Search ................ 252/DIG. 8, 170, 171, 252/364, 90; 134/38

[56] References Cited

U.S. PATENT DOCUMENTS

| | | | |
|---|---|---|---|
| 3,737,386 | 6/1973 | Geiss | 252/171 |
| 3,748,268 | 7/1973 | Loudas | 252/90 |
| 4,619,711 | 10/1986 | Olbrueck et al. | 134/38 |
| 4,830,772 | 5/1989 | Van DeMark | 252/170 |

FOREIGN PATENT DOCUMENTS 2146654  4/1985  United Kingdom ......... 252/DIG. 8

*Primary Examiner*—Robert A. Wax
*Assistant Examiner*—Eric Steffe
*Attorney, Agent, or Firm*—Kokjer, Kircher, Bradley, Wharton, Bowman & Johnson

[57] ABSTRACT

A stripping composition which does not contain methylene chloride. Equal parts methylethyl ketone, methanol, toluene, and acetone are mixed together to form the preferred composition. The stripping composition may be packaged in aerosol form using a isobutane and propane mixture as a propellant. In the aerosol formulation, a thickening agent such as Cab-o-sil EH-5, silica and a water washing agent such as Solemulose B ethoxylated emulsifier are added to the formulation.

8 Claims, No Drawings

PAINT STRIPPING COMPOSITION CONTAINING KETONES, METHANOL, AND AROMATIC HYDROCARBON

BACKGROUND OF THE INVENTION

This invention relates in general to stripping compositions and more particularly to stripping compositions which may be used to strip paint and other finishes from surfaces such as metal, wood, and concrete.

Methylene chloride has been the main ingredient for many years in stripping compositions because it will quickly soften a wide range of finishes for removal from varied surfaces such as wood furniture and automobile bodies. Stripping compositions which do not contain methylene chloride are, of course, also known and used. These compositions, however, are usually adapted for specialized purposes and lack the capability of methylene chloride to quickly soften a wide range of finishes. Consequently, methylene chloride has long been the mainstay of stripping compositions.

Recently, methylene chloride has been found to be a carcinogen and its widespread use in stripping compositions has been discouraged. Unfortunately, until now there has not been an adequate substitute for methylene chloride which is effective to quickly soften a similar range of finishes.

In addition to the health risks posed by the ingredients in conventional stripping compositions, they often contain acids or caustics which may damage the metal or wood surface underlying the paint or other finish being stripped. The acid or caustic ingredients are corrosive and may burn the wood, raise the grain of the wood or discolor the metal surface. Damage to the underlying surface often results because of the tendency of the methylene chloride to evaporate and leave behind the less volatile acids and caustics which then crystalize the paint or other finish. Multiple applications of the stripping composition are then required in order to remove the crystalized paint. These additional applications further increase the likelihood that the underlying surface will be damaged and also greatly increase the amount of stripping composition required to complete the stripping process.

SUMMARY OF THE INVENTION

It is an object of this invention to provide a composition which may be used to quickly strip paint, lacquers and other finishes from wood, metal and other types of surfaces and which does not utilize methylene chloride as an ingredient.

It is also an object of this invention to provide a composition for stripping paint, lacquers and other finishes from wood, metal and other types of surfaces which does not contain methylene chloride and which reduces the rate of evaporation of the active ingredients of the composition during the stripping process.

It is a further object of this invention to provide an improved stripping composition which does not contain methylene chloride or objectionable acids and caustics which cause crystalization of the paint upon evaporation of the stripping composition.

To accomplish these and other related objects of the invention, a stripping composition is prepared from a mixture of methylethyl ketone, methanol and one or more aromatic hydrocarbons. In the preferred composition, equal parts of methylethyl ketone, methanol, toluene and acetone are mixed together to form a fast acting stripping composition which is effective to strip most types of paints, lacquers, enamels, urethanes, and shellacs. The effectiveness of the stripping composition may be further enhanced by adding a thickening agent such as silica and an aerosol propellant.

DESCRIPTION OF THE PREFERRED EMBODIMENT

The composition of the present invention is directed to a mixture of methylethyl ketone (MEK), methanol, and one or more aromatic hydrocarbons. It has been discovered that blending together certain proportions of these ingredients unexpectedly produces an extremely fast acting stripping composition which is effective to quickly strip most types of paints, lacquers, enamels, shellacs, urethanes and other finishes from a range of surfaces.

The specific reasons for the synergistic co-action between these ingredients is not fully understood. MEK by itself is an unsatisfactory stripping agent because it is slow acting and is ineffective when used to strip many types of paints, enamels, lacquers and shellacs. Similarly, although it has been recognized that some aromatics such as acetone and toluene may cut some types of light enamels, lacquers and shellacs, they have heretofore been considered unsuitable as stripping agents because they are slow acting. When combined in the proportions and in the manner described herein, however, these components co-act to produce an excellent stripping composition.

The aromatic hydrocarbons which have been found suitable for use in the stripping composition of the present invention include methyl or ethyl substituted aromatic hydrocarbons. Other heavier molecular weight aromatics may also be used but the effectiveness of the final stripping composition diminishes as the heavier molecular weight aromatics are used. The aromatics preferred for use in the stripping formulation are toluene, acetone, and xylene.

The proportions of the components in the stripping composition may be varied and it has been found that suitable stripping compositions are formed from the following formula with the range of ingredients in weight percent of the total composition:

| | |
|---|---|
| MEK | 12–40% |
| methanol | 10–35% |
| toluene | 10–35% |
| acetone | 10–35% |

The toluene and/or acetone in the above formulation may be replaced by one or more other suitable aromatics such as xylene and other methyl or ethyl substituted aromatics.

It has been found that increasing the proportion of MEK in the stripping composition increases the rate at which the final composition strips paint and varnish. Similarly, when the proportions of toluene and/or acetone are increased, the final composition strips enamels, lacquers and shellacs at a faster rate. While the proportions of the various components may be varied as desired for use in particular applications, a preferred range of ingredients, by weight, for an all-purpose stripping composition is as follows:

| | |
|---|---|
| MEK | 22–33% |

| | |
|---|---|
| methanol | 20-30% |
| toluene | 20-30% |
| acetone | 20-30% |

Again, xylene or other methylethyl substituted aromatics may be substituted for the toluene and/or acetone in this formulation.

In a preferred formulation, equal parts of MEK, toluene, acetone and methanol are combined and unexpectedly produce an excellent, all-purpose stripping composition for quickly stripping paint, lacquer, epoxy, polyurethanes and other products from metal, wood, concrete, plastic and other surfaces. While this equal parts mixture is a preferred formulation, in certain applications it may be desired to replace the toluene with a less volatile aromatic such as xylene to reduce the rate of evaporation of the mixture during the stripping process.

Thickening agents may also be included in the stripping composition to make the final mixture gelatenous for improved adherence to the stripping surface. Suitable thickening agents include paraffin wax, fumed or pyralized silicas such as silicon dioxides sold under the Cab-o-sil trademark by Cabot Chemical Corp., water soluble resins such as acrylic acid polymers sold under the Carbopol trademark by B. F. Goodrich, and methyl cellulose and ethyl cellulose.

A water washing agent such as an anionic emulsifier may also be added to the mixture. Examples of suitable water washing agents include substituted ethoxylated emulsifiers or a modified ethoxylated emulsifier such as a product sold under the Solemulose B trademark by Hodag, Inc.

If a thickening agent is added to the stripping composition, it may comprise up to approximately 10% by weight of the total mixture. If a water washing agent is added to the stripping composition, it may comprise up to approximately 10% by weight of the total mixture. If both a thickening agent and a water washing agent are added, it is preferred that the total of these optional ingredients comprise up to approximately 12% by weight of the total mixture.

It has also been found quite unexpectedly that the effectiveness of the stripping composition may be enhanced by formulating the composition in an aerosol form with a hydrocarbon propellant comprising approximately 25% of the total mixture. Although the specific reasons for the improved performance are not generally understood, it has been observed that when one or more thickening agents are added to the stripping composition and mixed with the hydrocarbon propellant, the stripping composition swells slightly when applied to a stripping surface and a film forms on the surface of the stripping composition. Thus, it is believed that there may be a synergistic co-action between the thickening agents and the hydrocarbon propellant which somehow enhances the stripping capability of the composition. The film which forms on the surface is particularly advantageous as it reduces the rate of evaporation of the more volatile components of the composition. It is also believed that the film, in cooperation with the swelling of the composition, causes the composition to penetrate further into the finish being stripped for more effective removal.

The hydrocarbon propellant is preferably an isobutane propane mixture. The thickening agents which appear to be most effective in enhancing the stripping action when combined the hydrocarbon propellant comprise an equal parts mixture of paraffin wax and Cab-o-sil EH-5. Cab-o-sil EH-5 silica is a standard grade of silica available from Cabot Chemical Corp.

Preparation of the stripping compositions is illustrated in the following examples:

EXAMPLE 1

Equal parts of toluene, acetone, MEK and methanol are mixed together after first heating the toluene to approximately 85°-95° F. Paraffin wax is added to the heated toluene in an amount equal to approximately three parts by weight. The paraffin wax and toluene are mixed and acetone is then added to the mixture. To this mixture, MEK and methanol are added and thoroughly mixed to complete the composition.

EXAMPLE 2

Equal parts of toluene, acetone, MEK and methanol are thoroughly mixed. 10% by weight of Cab-o-sil EH-5 silica and 2% by weight of Solemulose B ethoxylate are combined with this mixture. It is preferred that the final mixture be allowed to sit approximately twenty-four hours after mixing to form a thick, paste-like composition.

EXAMPLE 3

To the composition as set forth in Example 1, two parts by weight of Solemulose B modified ethoxylate and three parts by weight of Cab-o-sil EH-5 pyralized silica are added. The resulting composition is then packaged in an aerosol spray can with the can contents containing seventy-five parts by weight of the resulting composition and twenty-five parts by weight of a hydrocarbon propellant such as an isobutane propane mixture.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A stripping composition characterized by an absence of chlorinated hydrocarbons and comprising:
   22 to 33 percent by weight methylethyl ketone;
   20 to 30 percent by weight methanol;
   20 to 30 percent by weight of one or more of the following: acetone, xylene and toluene; and
   20 to 30 percent by weight acetone.
2. A stripping composition comprising:
   25 percent by weight methylethyl ketone;
   25 percent by weight methanol;
   25 percent by weight of one or more of the following: xylene and toluene; and
   25 percent by weight acetone.

3. The composition of claim 1, including a thickening agent in an amount up to 10 percent by weight of the total mixture.

4. The composition of claim 3, wherein said thickening agent is selected from the group consisting of paraffin wax, silicon dioxides, water soluble resins, methyl cellulose and ethyl cellulose.

5. The composition of claim 1, including a water washing agent in an amount up to 10 percent by weight of the total mixture.

6. The composition of claim 5, wherein said water washing agent comprises an ethoxylated emulsifier.

7. The composition of claim 1, including a mixture of a thickening agent and a water washing agent in an amount up to 12 percent by weight of the total mixture.

8. The composition of claim 1, including a hydrocarbon propellant and a thickening agent in proportions effective to cause swelling of the composition and formation of a film on the surface of the composition when applied to a surface.

* * * * *